(12) United States Patent
Iida et al.

(10) Patent No.: US 6,666,008 B2
(45) Date of Patent: Dec. 23, 2003

(54) ELECTRIC LAWN MOWER

(75) Inventors: Tetsuo Iida, Wako (JP); Takao Kobyashi, Wako (JP); Kenzo Shimada, Wako (JP); Toshiaki Takizawa, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/177,424

(22) Filed: Jun. 21, 2002

(65) Prior Publication Data

US 2003/0037524 A1 Feb. 27, 2003

(30) Foreign Application Priority Data

Aug. 22, 2001 (JP) ........................................ 2001-252010
Aug. 22, 2001 (JP) ........................................ 2001-252072
Aug. 22, 2001 (JP) ........................................ 2001-252080

(51) Int. Cl.⁷ .............................................. A01D 69/00
(52) U.S. Cl. ...................................................... 56/11.9
(58) Field of Search ............................. 56/320.1, 11.9, 56/1; 180/229

(56) References Cited

U.S. PATENT DOCUMENTS 3,729,912 A * 5/1973 Weber ...................... 56/320.1
3,732,671 A      5/1973 Allen et al. .................. 56/10.2
4,882,896 A * 11/1989 Wilcox ......................... 56/10.5
5,085,043 A *  2/1992 Hess et al. ................... 56/10.5
5,402,626 A *  4/1995 Zinck ........................... 56/11.9
5,507,137 A *  4/1996 Norris ...................... 56/10.2 J
5,606,851 A *  3/1997 Bruener et al. ............... 56/11.9
5,619,845 A *  4/1997 Bruener et al. ............. 320/137
5,727,372 A *  3/1998 Kanitz et al. ................. 56/11.9
5,819,513 A   10/1998 Braun et al. .................. 56/11.9
5,823,557 A * 10/1998 Penza ....................... 280/304.5
5,894,715 A *  4/1999 Braun et al. .................. 56/11.9
5,906,088 A    5/1999 Inui et al. ................. 56/10.2 R
6,170,179 B1 *  1/2001 Paytas et al. ................. 37/246
6,455,186 B1 *  9/2002 Moores et al. ................ 429/71

FOREIGN PATENT DOCUMENTS

DE   2034844      * 7/1972
DE   9313032       12/1993
FR   2078734       11/1971
FR   2636498      * 3/1990
JP   10257814        9/1998

* cited by examiner

Primary Examiner—Thomas B. Will
Assistant Examiner—Alicia Torres
(74) Attorney, Agent, or Firm—Adams & Wilks

(57) ABSTRACT

An electric lawn mower includes a cutter blade, an electric motor disposed above the cutter blade, and a battery unit for driving the electric motor. The battery unit is positioned above the electric motor to thereby achieve weight balance of the lawn mower. This arrangement allows air to flow smoothly between the electric motor and the battery unit.

4 Claims, 14 Drawing Sheets

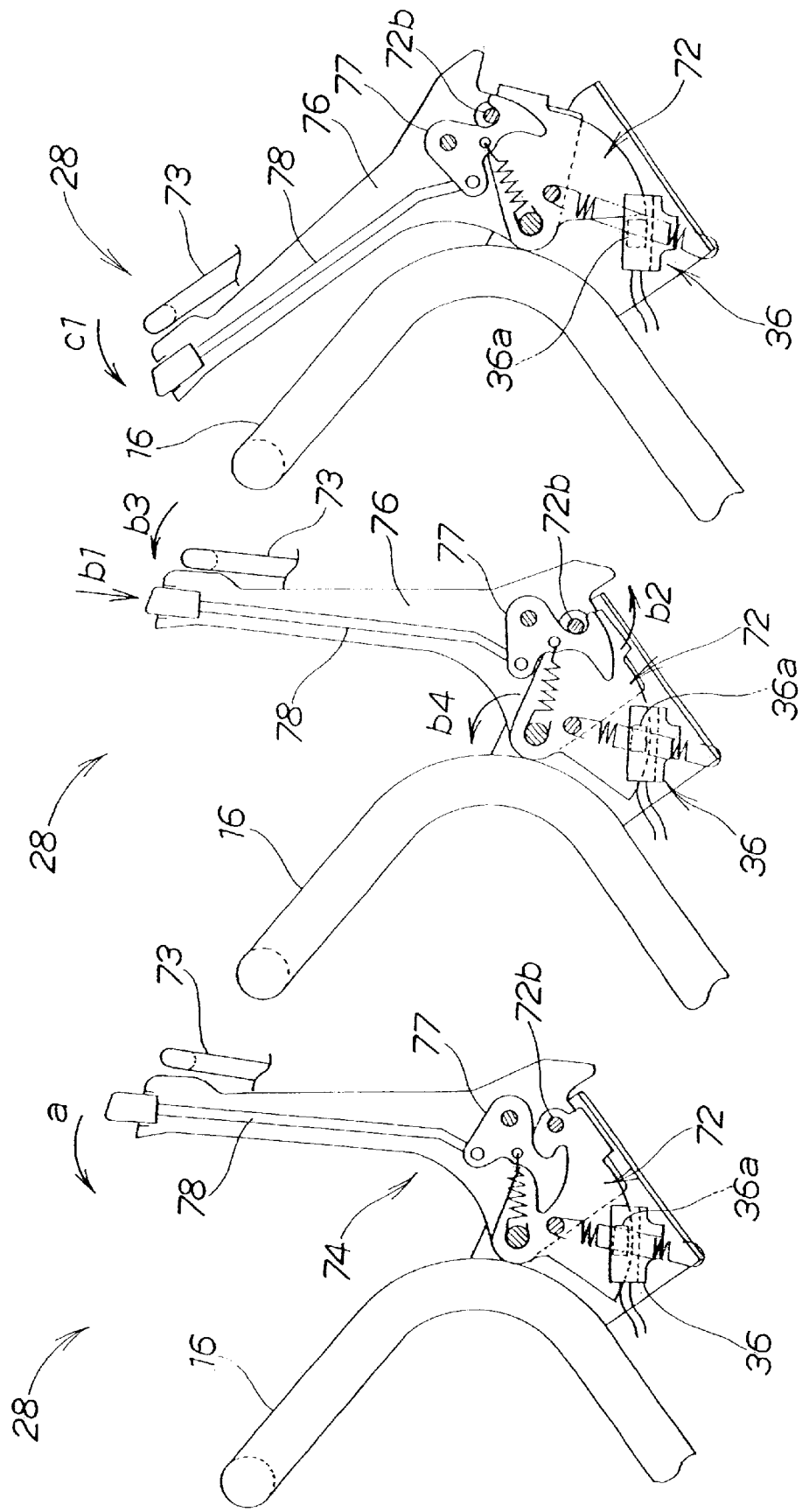

ELECTRIC LAWN MOWER

FIELD OF THE INVENTION

The present invention relates to an electric lawn mower including an electric motor and a rechargeable battery unit for driving the electric motor.

BACKGROUND OF THE INVENTION

Known electric lawn mowers are disclosed, for example, in Japanese Patent No. 2880116 entitled "POWER HEAD ASSEMBLY FOR ELECTRIC MOWER" and in Japanese Patent Laid-Open Publication No. HEI-10-257814 entitled "ELECTRIC LAWN MOWER".

The electric lawn mower disclosed in Japanese Patent No. 2880116 includes a lower housing having an electric motor mounted thereto. The lawn mower includes front and rear batteries having the electric motor interposed therebetween. One problem with the thus arranged lawn mower is that heat produced by the electric motor and heat produced by the batteries adversely affect or interfere with each other. That is, the electric motor and the batteries would fail to release heat therefrom.

The electric lawn mower disclosed in Japanese Patent Laid-Open Publication No. HEI-10-257814 includes a cutter housing, and an electric motor mounted to the cutter housing. Batteries of the lawn mower are disposed in the form of a V. The batteries have the electric motor disposed between front ends thereof.

The batteries are disposed rearwardly of the electric motor. With this arrangement, the weight of the electric motor would not be balanced with the weight of the batteries. The lawn mower thus arranged may be made hard to manipulate. What has been needed is an easy-to-operate electric lawn mower including a battery and an electric motor designed to release heat therefrom.

SUMMARY OF THE INVENTION

According to one aspect of the present invention, there is provided an electric lawn mower including: a cutter blade; a cutter housing for enclosing the cutter blade therein; an electric motor for rotating the cutter blade, the electric motor being mounted on the cutter housing; and at least one rechargeable battery unit for driving the electric motor, the battery unit being positioned above the electric motor.

As is well known in the art, the electric motor and the battery unit are heavier components forming the electric lawn mower. Generally, the electric motor serves to rotate the cutter blade in a horizontal plane. Thus, the electric motor is positioned substantially centrally of the cutter housing. Manipulation of the electric lawn mower is influenced by where the heavy battery unit is positioned. This is why the battery unit is disposed above the electric motor. This allows the electric lawn mower to lie stably. The electric lawn mower thus arranged can be handled well to thereby cut grass with improved efficiency. By positioning the battery unit above the cutter blade, there can be achieved weight balance of the electric lawn mower. Further, the electric motor and the battery unit allow air to flow smoothly therebetween.

Preferably, the cutter housing may have a battery bracket attached thereto. The battery bracket includes a body portion covering the sides and top of the electric motor. The battery bracket has the battery unit mounted thereto. The electric motor is spaced from the battery unit, such that heat of the electric motor and heat of the battery unit do not interfere with each other.

Further, the battery bracket and the electric motor may be secured together to the cutter housing. It thus becomes possible to assemble the electric lawn mower with improved efficiency.

Preferably, the battery bracket may be made of metal, and have air vents formed at portions thereof where the battery unit is mounted. This arrangement helps the electric motor and the battery unit release heat therefrom.

Further, the electric motor may include a rotational shaft having an axis extending through the battery unit positioned above the electric motor. This arrangement is suitable for achieving weight balance of the electric lawn mower.

Preferably, the battery unit may include at least one upper battery disposed above the electric motor and a front battery positioned in front of the electric motor. With this arrangement, the electric lawn mower can reliably provide weight balance. Such an electric lawn mower can be manipulated with improved efficiency.

Further, the cutter housing may have a battery bracket attached thereto. The battery bracket includes a body portion covering the sides and top of the electric motor, and an extension portion extending forward from the body portion. The body portion has the upper battery mounted there on whilst the extension portion has the front battery mounted thereon. The upper battery is spaced from the front battery. With this arrangement, air flows smoothly between the battery unit and the electric motor to thereby promote heat radiation from the battery unit and the electric motor.

BRIEF DESCRIPTION OF THE DRAWINGS

Certain preferred embodiments of the present invention will hereinafter be described in detail, by way of example only, with reference to the accompanying drawings, in which:

FIG. 15A to FIG. 15C are views explanatory of behavior of the switch operation mechanism of FIG. 13.

DETAILED DESCRIPTION OF THE PREFERRED EMBODIMENTS

Figure 1:
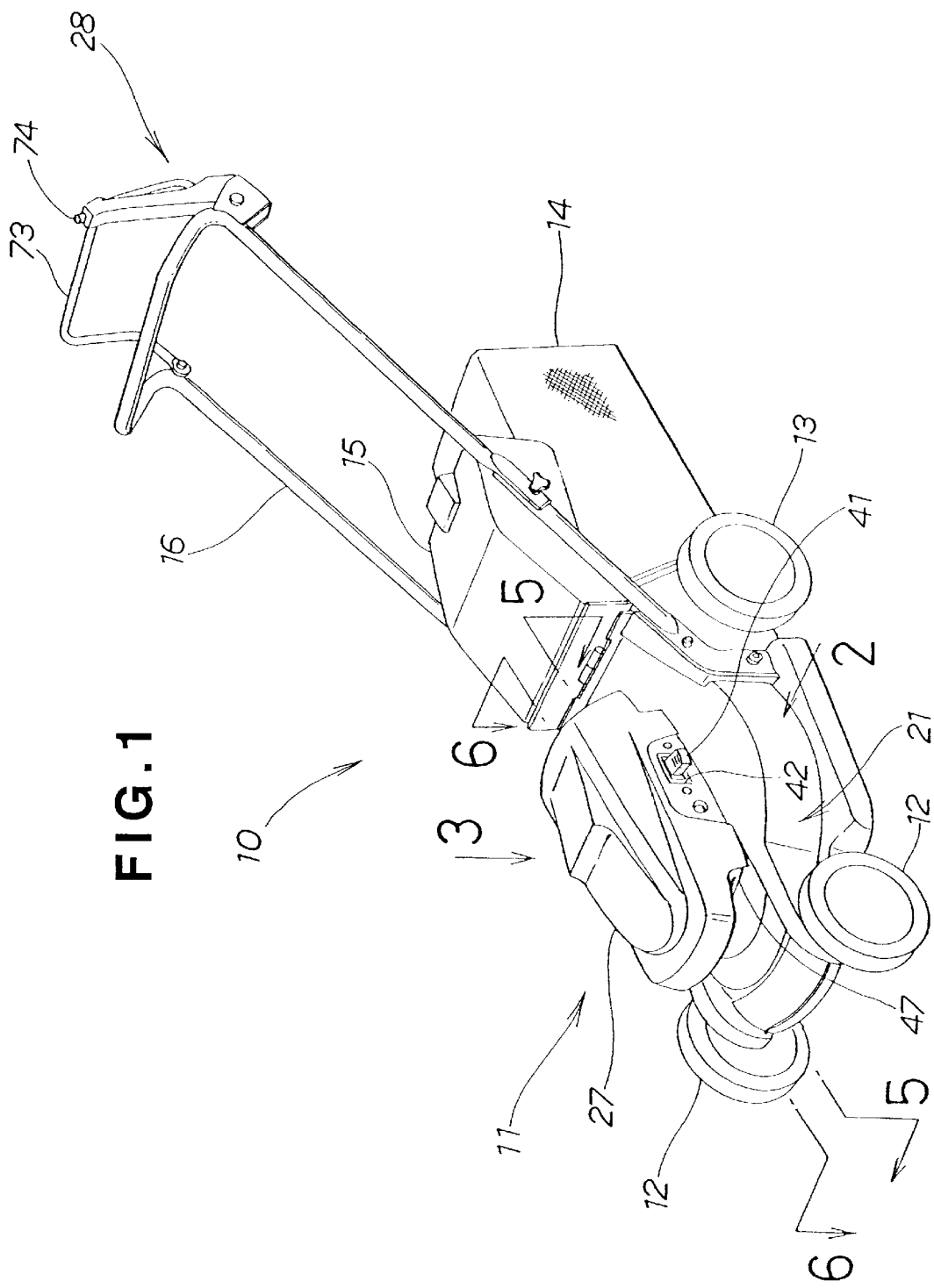
FIG. 1 is a perspective view of an electric lawn mower in accordance with an embodiment of the present invention.

Referring to FIG. 1, there is shown an electric lawn mower 10. The electric lawn mower 10 includes a machine body section 11, front wheels 12, rear wheels 13, a grass bag 14, a discharge port cover 15, a handle 16, a cutter housing 21, a covering 27, and a switch operation mechanism 28. The electric lawn mower 10 also includes a main key 41 that functions as a connecting member or male plug for insertion into a relay member 42 functioning as a female socket, for turning on/off the lawn mower 10. The switch operation mechanism 28 includes a handling lever 73 and a clutch mechanism 74.

The lawn mower 10 includes a battery unit 26 and an electric motor 22, as will be described later. The battery unit 26 is disposed over the electric motor 22, as will be discussed later, thereby ensure that the lawn mower lies stably.

Figure 2:
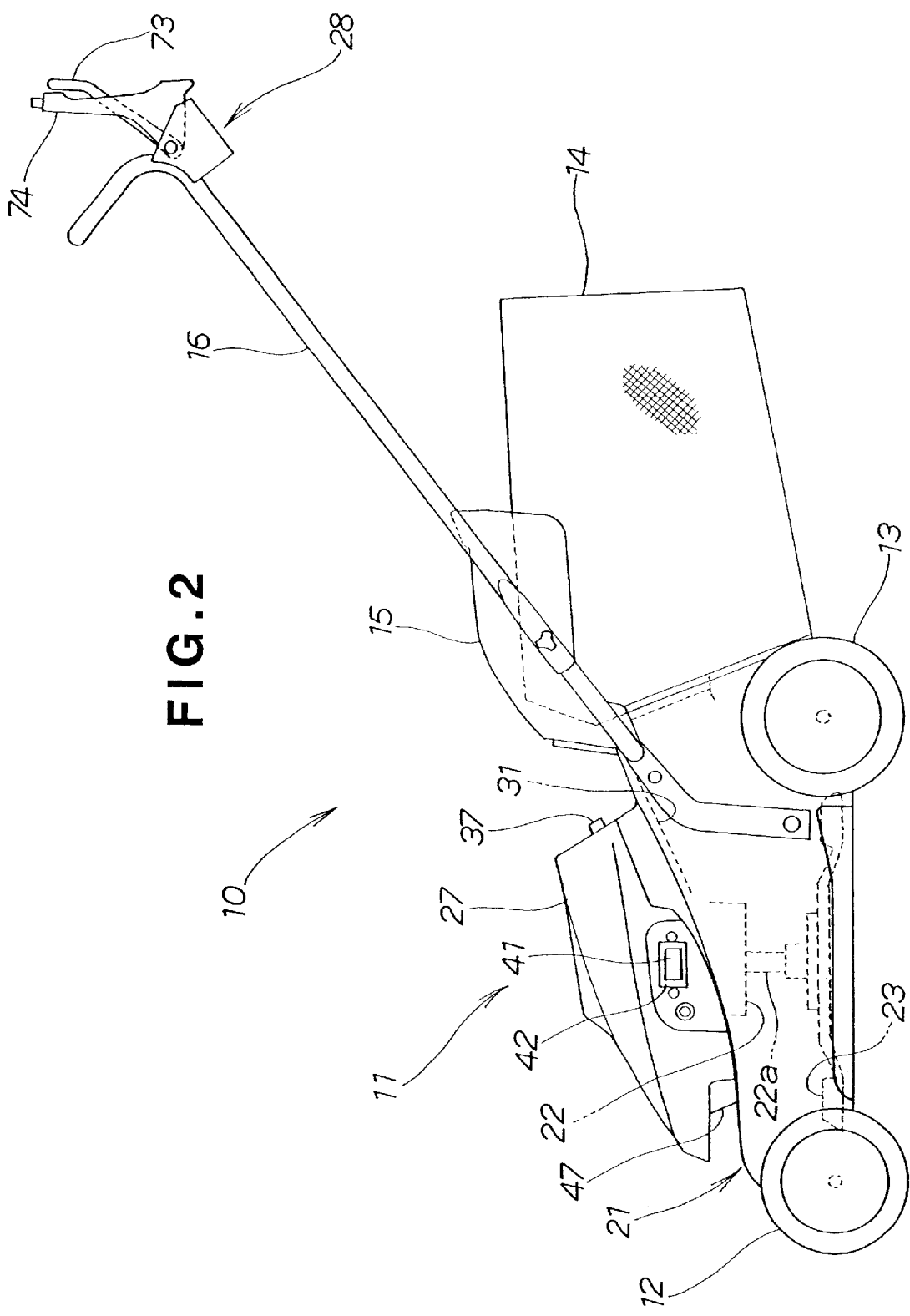
FIG. 2 is a view of the electric lawn mower taken in a direction of arrow "2" of FIG. 1.

Reference is made to FIG. 2. The electric motor 22 is turned on or off by the main key 41 being inserted into or removed from the relay member 42 provided in the machine body section 11. A cutter blade 23 within the cutter housing 21 is rotated by the electric motor 22 to cut the grass, and resulting grass clippings are delivered, through a scroll portion 31 within the cutter housing 21, to a rear portion of the machine body section 11 so that the grass clippings are collected into the grass bag 14. The electric lawn mower 10 is construed as a rear-discharge type mower.

Figure 3:
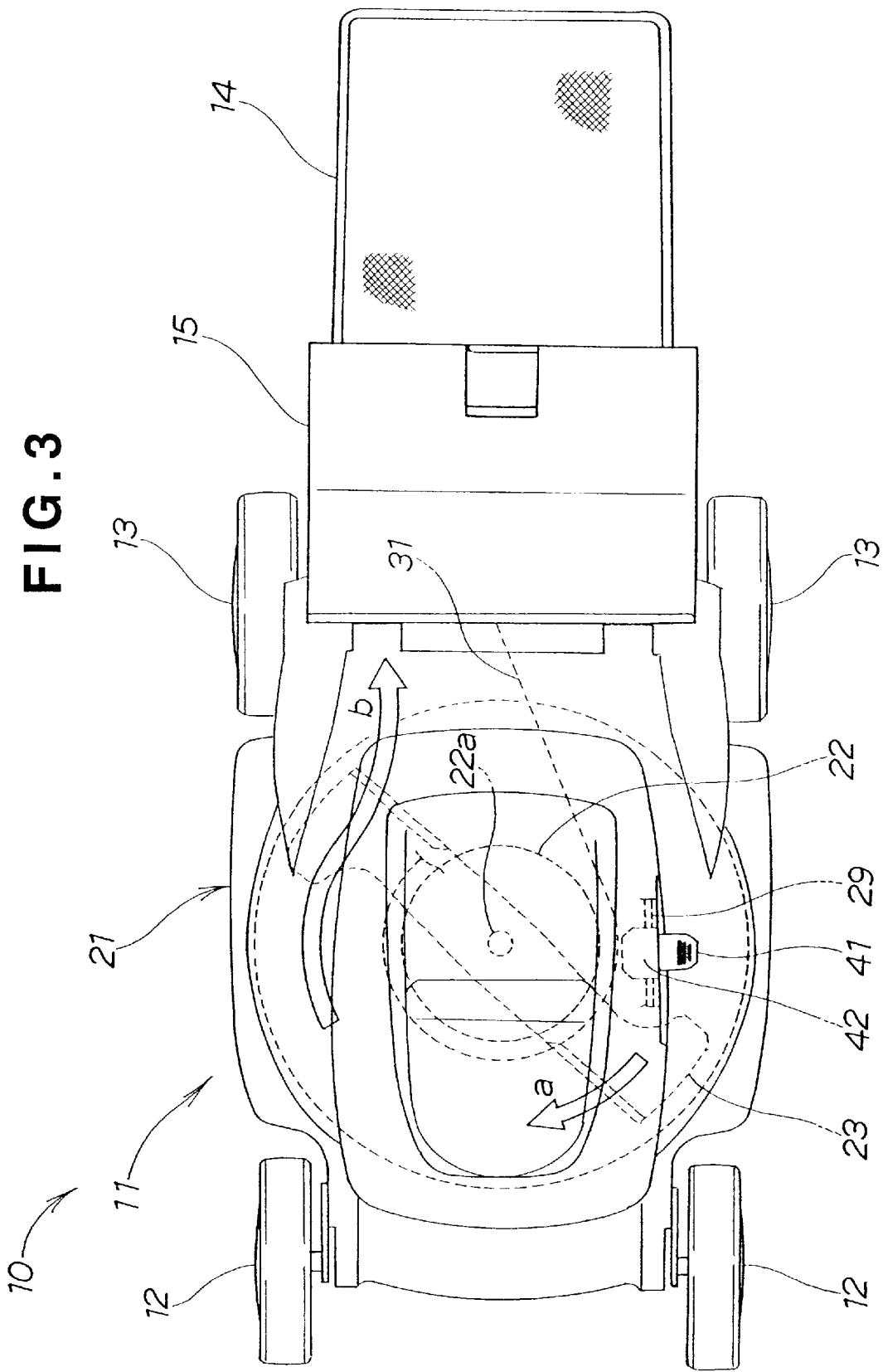
FIG. 3 is a view of the electric lawn mower taken in a direction of arrow "3" of FIG. 1.

Turning to FIG. 3, with the main key 41 inserted into the relay member 42, the electric motor 22 is turned on by the switch operation mechanism 28 shown in FIG. 1, so that the thus-activated motor 22 rotates the cutter blade 23 as denoted by arrow "a" to cut the grass. The resulting grass clippings are driven, by vortexes produced by the rotating cutter blade 23, into the grass bag 14 through the scroll portion 31 of the cutter housing, as shown by arrow "b".

Namely, in this rear-discharge-type electric lawn mower 10, the scroll portion 31 is disposed within one of left or right side areas of the machine body section 11, and the relay member 42 and a mounting bracket 29 are disposed in the other of the left or right side areas.

Generally, in the rear-discharge-type electric lawn mowers where grass clippings are delivered, through the scroll portion, to the rear portion of the machine body section 11 and are ultimately collected into the grass bag, there arises a need to clean the scroll portion from time to time because the grass clippings tend to adhere to the surface of the scroll portion; thus, it is preferable that the electric lawn mowers be constructed in such a manner as to facilitate the cleaning of the scroll portion.

This is why the scroll portion 31 in the instant embodiment is disposed within one of the left or right side areas of the machine body section 11 while the relay member 42 is disposed in the same side area as the scroll portion 31. With this arrangement, the human operator can easily clean the scroll portion 31 after he or she first pulls out the main key 41 from the relay member 42 on the other side of the body section 11 and then lays the machine body section 12 sideways with the one side facing upward. That is, the human operator can attend to the removal of the main key 41 and sideways laying of the machine body section 12 from a same operating position (without having to change the operating position from one side of the machine body section 11 to the other side), thereby enhancing the efficiency in the cleaning operations.

The following paragraphs detail the construction of the electric lawn mower 10.

Figure 4:
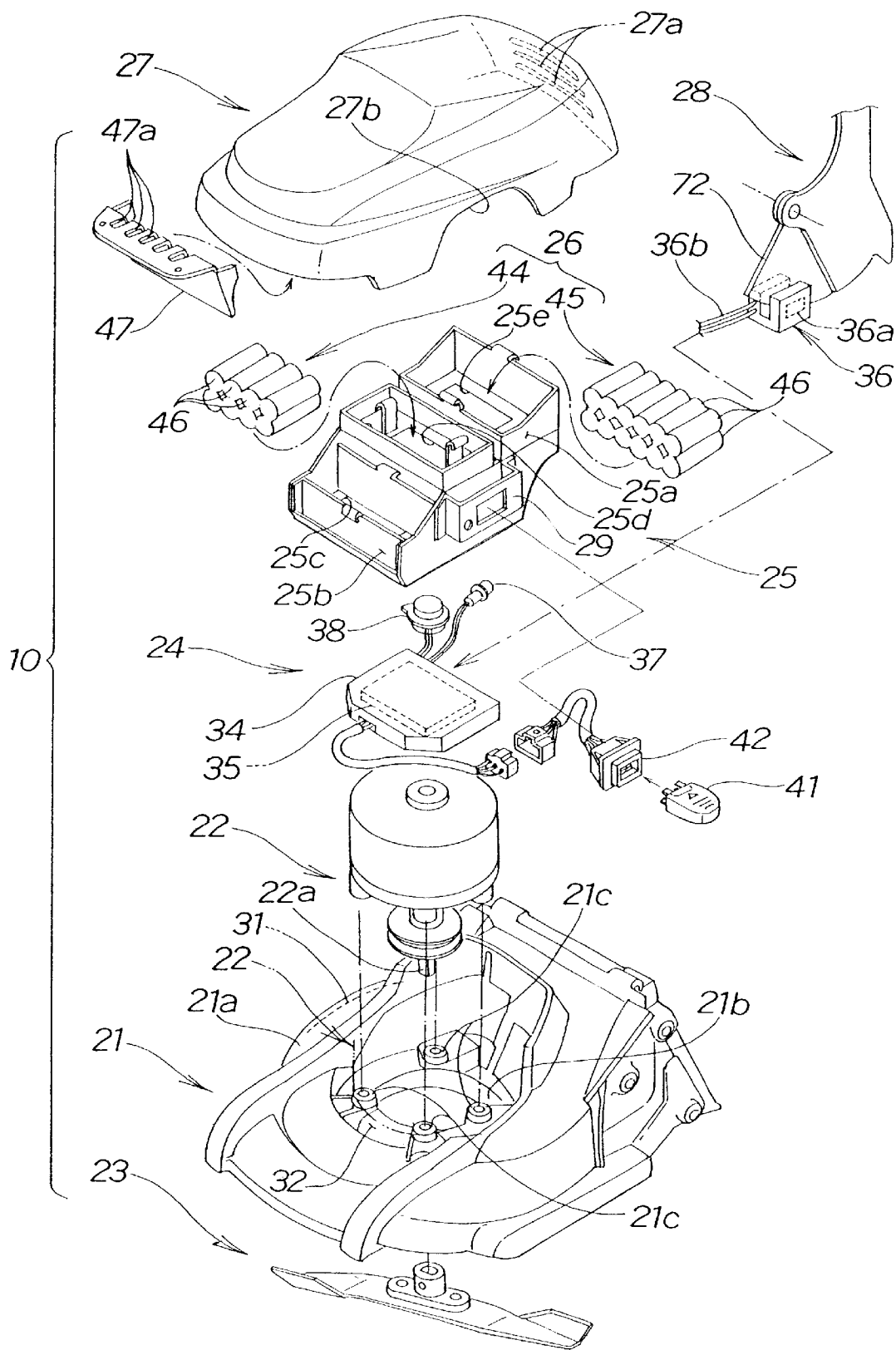
FIG. 4 is an exploded perspective view of the electric lawn mower as shown in FIG. 1.

FIG. 4 is an exploded perspective view of the electric lawn mower 10, which shows principal components of the lawn mower 10. As shown in FIG. 4, the electric motor 22 is mounted on the cutter housing 21. The cutter blade 23 is attached to a rotation shaft 22a of the motor 22. A control section 24 is disposed above the motor 22. The electric lawn mower 10 also includes a battery bracket 25 attached to the cutter housing 21 from above the motor 22 and control section 24, and a battery unit 26 supported on the battery bracket 25. The covering 27 collectively covers the electric motor 22, the control section 24, the battery bracket 25 and the battery unit 26. The electric motor 22 is controlled to be ON or OFF by the switch operation mechanism 28. The battery bracket 25 is secured to the cutter housing 21 at the same time that the motor 22 is secured to the cutter housing 21.

The cutter housing 21 has a relatively large upward opening 21b receiving therein the motor 22, and a plurality of bosses 21c by which the motor 22 is fixed to a housing body 21a of the cutter housing 21. The housing body 21a has the scroll section 31 formed therein for delivering the grass clippings to the rear grass bag 14 while simultaneously permitting the rotation of the cutter blade 23.

With the electric motor 22 mounted to the cutter housing 21 through the bosses 21c, there are formed communicating holes 32 (only one of which is shown in FIG. 4) communicating between the interior and exterior of the cutter housing 21.

The control section 24 includes a casing 34 and a control board 35 accommodated in the casing 34. The control board 35 is coupled with a noncontact reed switch 36 that constitutes an important part of the switch operation mechanism 28 for controlling the motor 22. To the control board 35, there are also connected a display lamp 37 for being normally illuminated to inform the human operator that the electric lawn mower 10 is in operable condition. In addition to the lamp 37, a buzzer 38 is connected to the control board 35. The buzzer 38 is designed to keep sounding while the machine body section 11 is traveling or performing any of various operations. The control section 24 also includes the above-mentioned main key 41 and relay member 42 for powering on the lawn mower 10.

Note that the relay member 42 functions also as a recharge connector for recharging the battery unit 26 as will be later described.

The battery bracket 25, which is made of a metal material, includes a body portion 25a that covers the sides and top of the electric motor 22, a forward extension portion 25b extending horizontally forward from the body portion 25a, and the mounting bracket 29 to which the relay member 42 is fitted. The battery bracket 25 is secured to the cutter housing 21 along with the motor 22, as stated earlier.

The body portion 25a has airvents 25c, 25d formed therein, and the forward extension portion 25b has an air vent 25e formed therein. Although, in the illustrated embodiment, the air vents 25c, 25d, 25e are formed at the bottom of the battery bracket 25, they may be formed at the side of the battery bracket 25.

As stated above, the electric lawn mower 10 of the present invention has the battery bracket 25 and electric motor 22 secured together to the cutter housing 21. By thus securing the battery bracket 25 and electric motor 22 together to the cutter housing 21, it is possible to assemble the electric lawn mower 10 with improved efficiency.

The battery unit 26, which is mounted on an upper portion of the cutter housing 21 and preferably a nickel-cadmium battery unit, includes first and second upper batteries 44 and 45.

The first and second upper batteries 44 and 45 each include a group of electric cells 46 each having a rated voltage of 1.2 V, and these upper batteries 44 and 45 lie on the body portion 25a of the battery bracket 25.

The battery unit 26 may be formed by other high-performance batteries than the nickel-cadmium batteries, such as other types of nickel- or lithium-based batteries. It is generally known that the temperature of the nickel- or lithium-based batteries can be controlled relatively easily during recharging operations. Thus, the battery unit 26 comprising such nickel- or lithium-based batteries can be recharged with significantly improved efficiency.

The covering 27, which is preferably made of resin, includes a louver 47 provided on its lower front portion and, the louver 47 has plural openings 47a for air currents to and from the interior of the covering 27. The covering 27 also has air vents 27a formed in its rear end portion and a recess 27b formed in its left side for allowing the relay member 42 to open to the outside.

Figure 5:
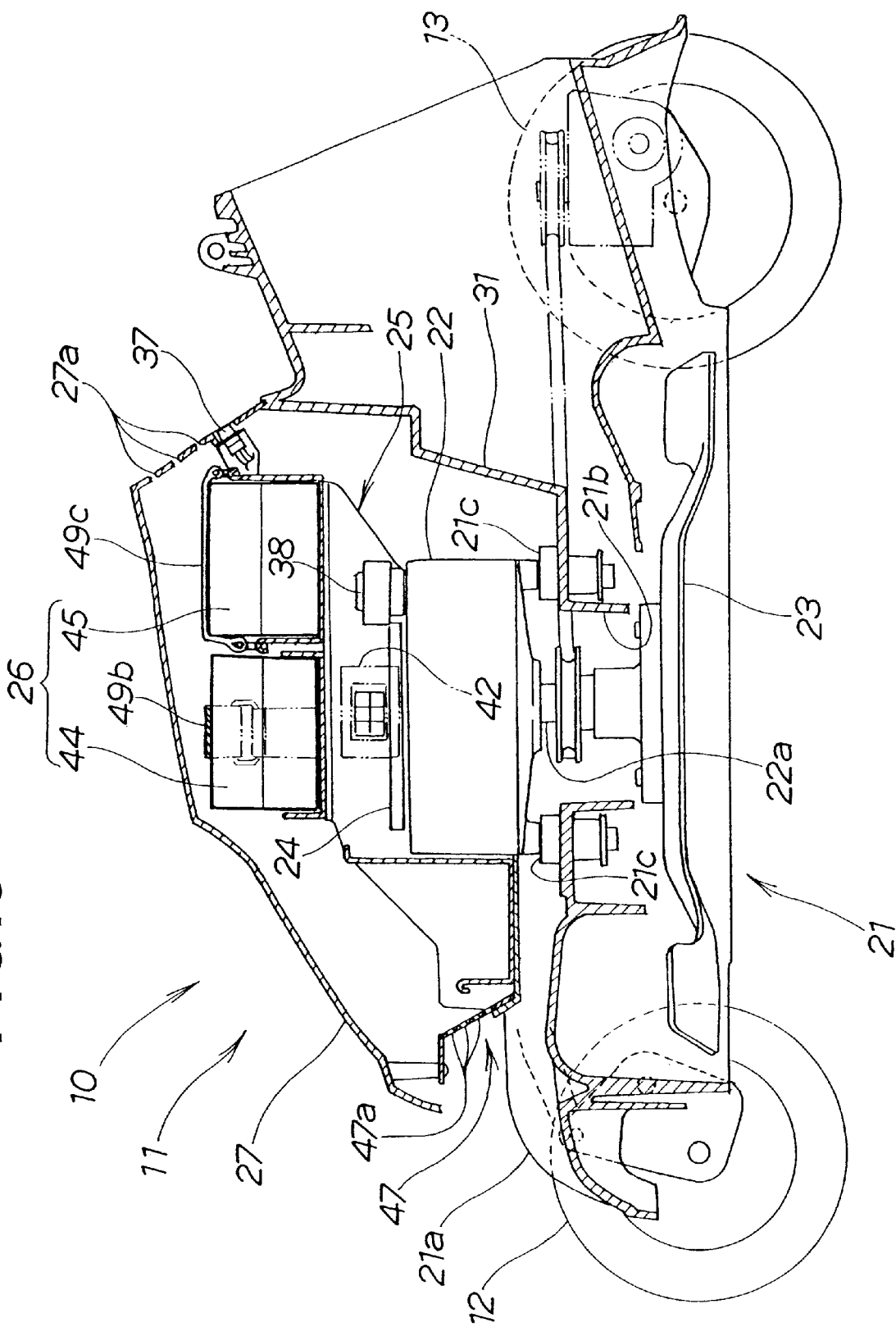
FIG. 5 is an enlarged cross-sectional view of the electric lawn mower taken alone the 5—5 line of FIG. 1.

As shown in FIG. 5, the first and second upper batteries 44, 45 are positioned above the electric motor 22.

Of the components forming the electric lawn mower, the electric motor and the battery are heavier ones. It is generally known that the electric motor is positioned substantially centrally of the cutter blade because the former, when driven, rotates the cutter blade in a horizontal plane. Whether the electric lawn mower is stably manipulated depends upon the weight of the battery. This is why the battery unit 26 (the first and second upper batteries 44 and 45) is positioned above the motor 22. With the batteries 44 and 45 positioned above the motor 22, it is possible to achieve appropriate weight balance of the electric lawn mower 10, which can thereby improve operability of the electric lawn mower 10.

The motor 22 and battery unit 26 are covered collectively with the covering 27. The covering 27 has a front half portion shaped to progressively slant upward in the front-to-rear direction of the mower 10, the louver openings 47a formed in its lower front, and the air vents 27a formed in its upper rear. Thus, the battery unit 26 and motor 22 can be cooled by external cool air being introduced into the covering 27 through the front louver openings 47a and discharged out of the covering 27 through the rear air vents 27a. This arrangement can effectively prevent the battery unit 26 and motor 22 from overheating, which thereby allows the electric lawn mower 10 to withstand long-time continuous operation.

Figure 6:
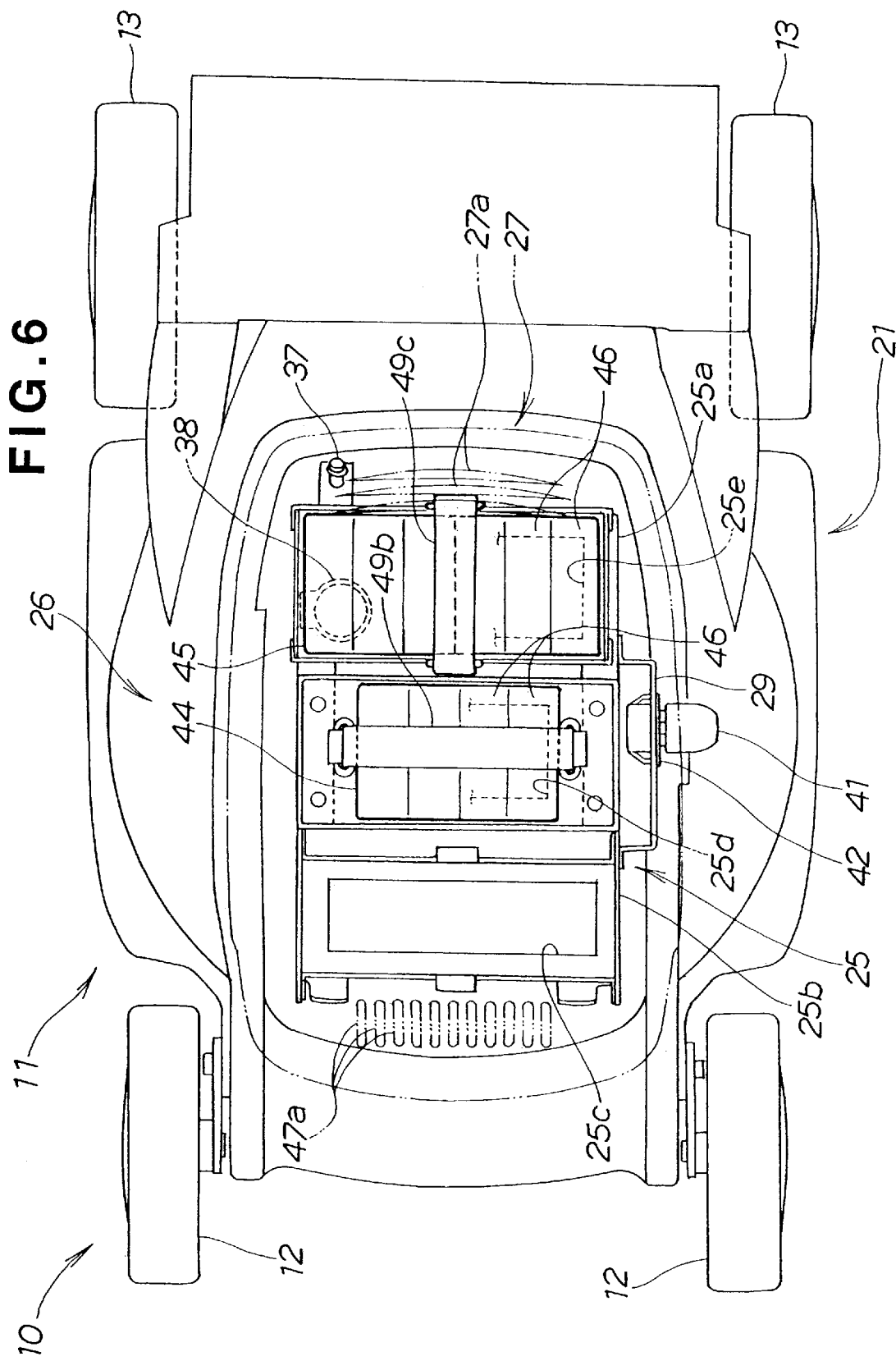
FIG. 6 is an enlarged cross-sectional view of the electric lawn mower taken alone the 6—6 line of FIG. 1.

FIG. 6 shows the mower 10 with the covering 27 removed as shown by a double-dot-and-dash line. The cutter housing 21 has fixed thereto the battery bracket 25 including the body portion 25a covering the sides and top of the electric motor 22 and the forward extension portion 25b extending forward from the body portion 25a. The first and second upper batteries 44 and 45 are mounted on the body portion 25a. This arrangement of the batteries 44 and 45 allows cool air to easily flow among the batteries 44 and 45 and electric motor 22, and thereby promotes heat radiation from the batteries 44, 45 and motor 22.

Further, because the battery bracket 25 is made of a metal material and has the air vents 25c, 25d, 25e formed at portions thereof where the batteries 44, 45 are mounted, it is possible to further promote heat radiation from the batteries 44, 45 and the electric motor 22.

Note that reference numerals 49b, 49c represent elastic belts that fasten the front and second upper batteries 44, 45 to the battery bracket 25.

Figure 7:
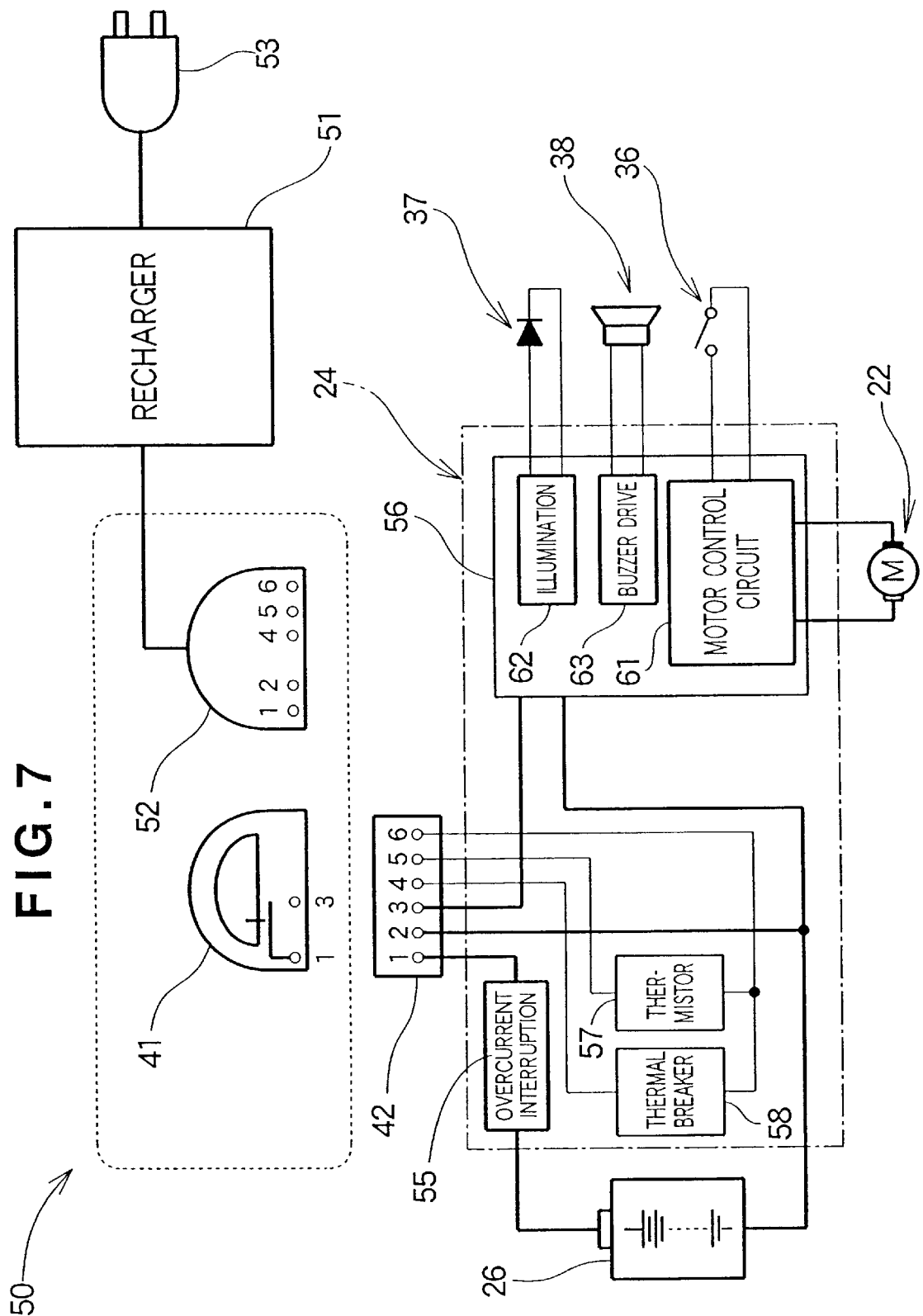
FIG. 7 is a hardware block diagram showing a control system of the electric lawn mower for controlling an electric motor and recharging a battery unit.

As shown in FIG. 7, the control system 50 generally includes the above-described control section 24 for controlling the electric motor 22, and a recharger 51 for recharging the battery unit 26.

The control section 24 includes an overcurrent interruption circuit 55 for interrupting an overcurrent, a control block 56 for controlling behavior of the electric lawn mower 10, a thermistor 57 for monitoring the temperature of the battery unit 26 during the recharge, and a thermal breaker 58 for terminating the recharge on the basis of an output signal from the thermistor 57. The control section 24 also includes the above-described relay member 42 into which either the main key 41 or the plug of the recharger 51 can be inserted as necessary.

The control section 24 constantly monitors, via the thermistor 57, the temperature of the battery unit 26 during the recharge; namely, the control section 24 has a function of managing and controlling the temperature of the battery unit 26. By the control section 24 having the battery-temperature managing/controlling function, the battery unit 26 can be recharged with enhanced reliability, as a result of which the battery unit 26 can have prolonged operating life.

The control block 56 includes a motor control circuit 61 for controlling operation of the electric motor 22, an illumination circuit 62 for illuminating the above-mentioned display lamp 37 in the form of a light-emitting diode (LED), and a buzzer drive circuit 63 for driving the buzzer 38.

To the motor control circuit 61 is connected the noncontact reed switch 36 of the switch operation mechanism 28 (FIG. 4) for turning on/off the electric motor 22.

The illumination circuit 62 keeps illuminating the display lamp 37 while the voltage of the battery unit 26 is higher than a predetermined voltage level immediately above a later-described memory-effect inducing voltage level, but deilluminates (turns off) the display lamp 37 once the voltage of the battery unit 26 falls below the predetermined voltage level. Specifically, the illumination circuit 62 keeps illuminating the display lamp 37 except when the voltage of the battery unit 26 is lower than the predetermined voltage level of, for example, 0.97 volts/cell.

With the provision of the display lamp 37 kept illuminated while the voltage of the battery unit 26 is exceeding the predetermined voltage level immediately above the memory-effect inducing voltage level, the human operator may continue mowing while the display lamp 37 is being illuminated, and stop mowing once the display lamp 37 is turned off. With the display lamp 37 turned off, the operator may recharge the battery unit 26. Namely, the display lamp 37 can inform the human operator of appropriate timing to recharge the battery unit 26. As a consequence, it is possible to prevent the operating life of the battery unit 26 from being improperly shortened.

The buzzer drive circuit 63 causes the buzzer 38 to keep sounding while the electric motor 22 is rotating, but to stop sounding once the voltage of the battery unit 26 falls below a predetermined voltage level. Namely, the buzzer 38 can inform the human operator that the electric lawn mower 10 is currently in the actual operating state.

Generally, the motor-driven electric lawn mowers can operate with noise much lower than the engine-driven lawn mowers. Thus, where such an electric lawn mower is used in a great-noise environment, a human operator may not be able to easily judge, through his or her hearing, whether or not the electric lawn mower is currently in the actual operating state. Thus, with the buzzer 38 that keeps sounding while the electric motor 22 is rotating to cause the machine body section 11 to travel or perform any of various other operations and thereby informs the human operator that the electric lawnmower 10 is currently in the actual operating state, the working efficiency and operability of the lawn mower 10 can be improved.

Further, because the buzzer 38 is deactivated when the voltage of the battery unit 26 falls below the predetermined voltage level, it is possible to avoid wasteful power consumption of the battery unit 26.

The relay member 42 is a connector having six terminals C1–C6 (denoted simply as "1"–"6" in the figure due to a limited space), of which the first terminal C1 functioning as a positive polarity terminal is connected to the positive pole of the battery unit 26 via the overcurrent interruption circuit 55. The second terminal C2 is connected to the negative pole of the battery unit 26 and one of two input terminals of the control block 56. The third terminal C3 is connected to the other input terminal of the control block 56. The fourth terminal C4 is connected via the thermal breaker 58 to the sixth terminal C6. The fifth terminal C5 is connected through the thermistor 57 to the sixth terminal C6.

The main key 41 is in the form of a plug having a pair of electrically connected pins P1, P3 (denoted simply as "1" and "3" in the figure due to a limited space). The pins P1, P3, when inserted into and connected to the first and third terminals C1 and C3, respectively, of the relay member 42, connect the terminal C1 to the terminal C3.

The recharger 51 for recharging the battery unit 26 includes the recharging plug 52 for connection to the relay member 42 and a power supply plug 53 for connection to the AC line.

The recharging plug 52 has five pins R1, R2, R4, R5, R6 (denoted simply as "1", "2", "4", "5", "6" in the figure due to a limited space) for connection to the first to the five terminals C1, C2, C4, C5, C6, respectively, of the relay member 42.

From the foregoing, it should be apparent that the relay member 42 is a connector to which either the main key 41 or the recharging plug 52 of the recharger 51 is connectable as necessary.

In other words, the relay member 42 in the electric lawn mower 10 of the invention is constructed in such a manner that the relay member 42 alone is connectable with the recharger 51 for recharging the battery unit 26 as well as with the main key 41. Specifically, the main key 41 can be inserted and connected to the relay member 42 when the electric lawn mower 10 is to operate for the grass cutting purposes, while the recharger 51 can be inserted and connected to the relay member 42 when the battery unit 26 is to be recharged. As a result, the electric lawn mower 10 can work with increased convenience and efficiency at the time of the discharge (i.e., grass cutting operations) or recharge of the battery unit 26.

The relay member 42 has the positive-polarity terminal C1 which is directly connectable with the positive pole of the battery unit 26. The terminal C1 functions as a recharging positive-polarity terminal connectable with the recharger 51 to recharge the battery unit 26. In other words, the first terminal C1 serves as the positive-polarity terminal for both recharging the battery unit 26 and driving the electric lawn mower 10. With the terminal C1, it is possible to simplify the construction of the control section 24 and relay member 42. As a result, the necessary overall cost of the electric lawn mower 10 can be reduced to a considerable degree.

The relay member 42 is interposed between the battery unit 26 and the control section 24. Inserting the main key 41 into the relay member 42 connects operatively the battery unit 26 to the control section 24. Further, removing the connecting member (main key) 41 from the relay member 42 can completely disconnect the control section 24 from the battery unit 26. Such an arrangement can minimize unnecessary electrical discharge from the battery unit 26 in a non-operating state of the electric lawn mower 10, and prevent overdischarge during long-term storage of the electric lawn mower 10. As a result, the battery unit 26 can have even longer operating life.

Figure 8:
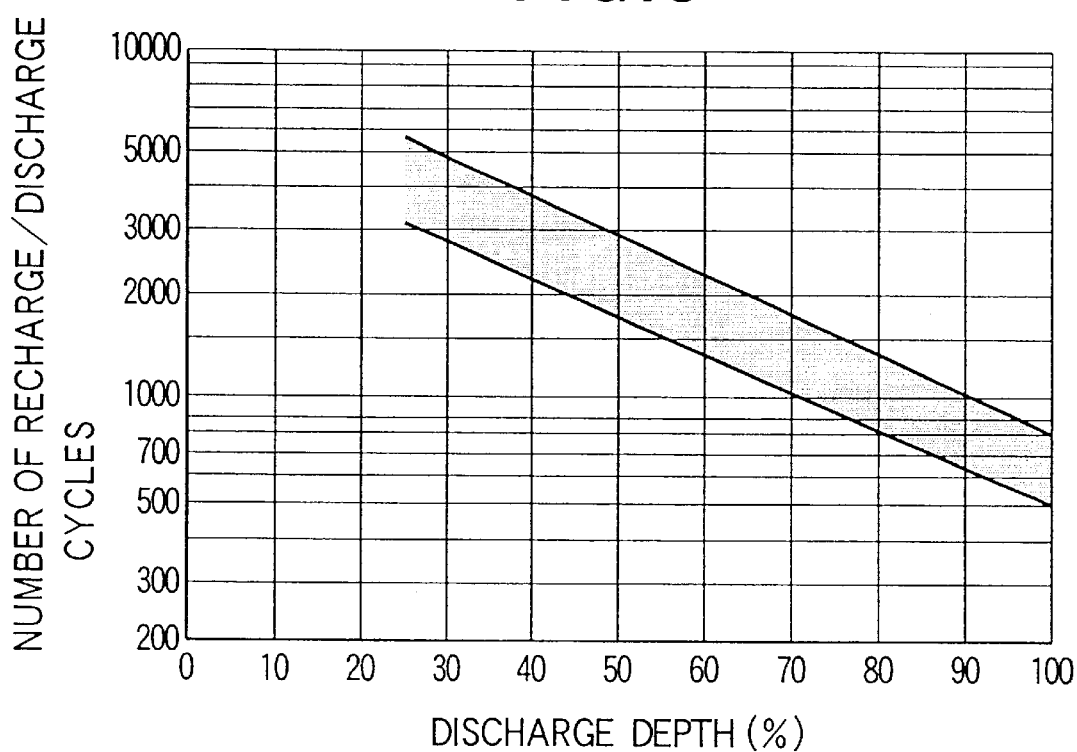
FIG. 8 is a graph explanatory of operating life characteristics of a battery unit employed in the electric lawn mower of the present invention.

FIG. 8 is a graph explanatory of operating life characteristics of the battery unit 26 employed in the electric lawn mower 10 of the invention, where the horizontal axis represents a variation in the discharge depth (%) while the vertical axis represents a variation in the number of recharge/discharge cycles. The "discharge depth" as used herein means a depth of electrical discharge from the battery unit 26 and is expressed by the percentage; let it be assume that when the battery unit 26 having a capacity of "100" is completely discharged, the discharge depth is expressed "100%". The "number of recharge/discharge cycles" as used herein means a total number of times the battery unit 26 can be recharged and discharged.

As known in the art, the nickel-cadmium battery can restore the capacity even after it is completely discharged and is thus more tolerant of overdischarge than lead-based or other types of batteries. However, repetition of complete discharge would lead to shortened operating life of the battery. For example, if the complete discharge is repeated, the number of recharge/discharge cycles is limited to a range of 500 to 800, while if 50% discharge is repeated, the number of recharge/discharge cycles can increase up to a range of 1,700 to 1,800, as shown in FIG. 8.

Figure 9:
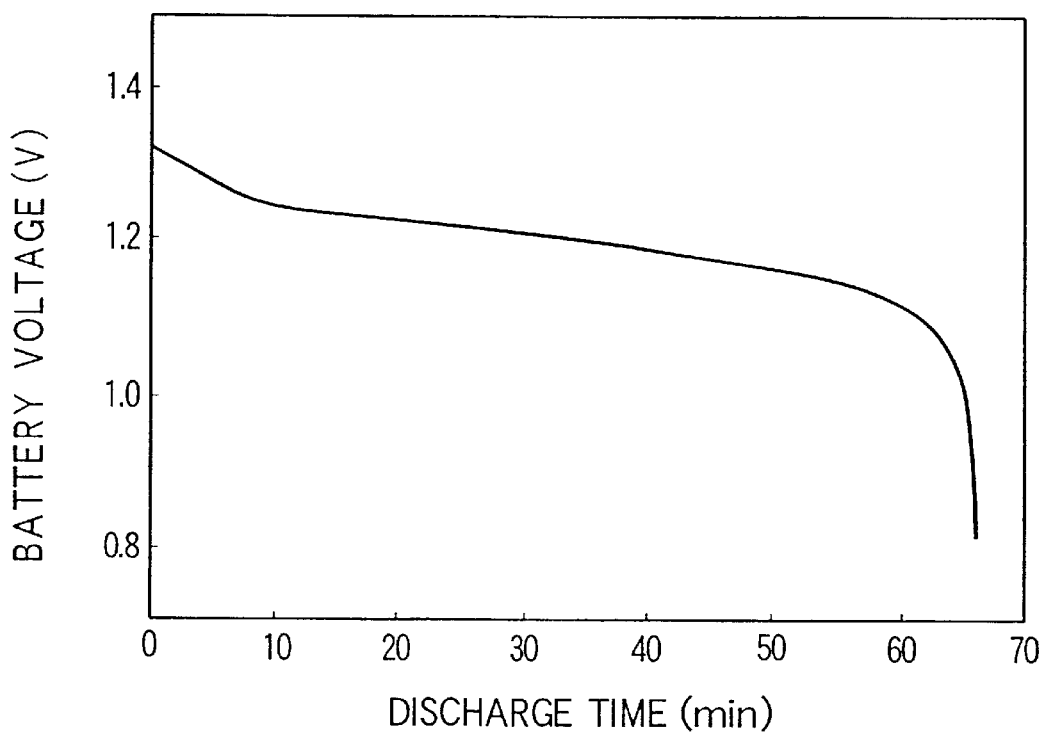
FIG. 9 graphically shows how voltage applied to the battery unit is changed with respect to discharge time.

FIG. 9 is a graph explanatory of the memory effect of the battery unit 26 employed in the electric lawn mower 10 of the invention, where the horizontal axis represents a variation in the discharge time (min.) while the vertical axis represents a variation in the battery voltage (V).

As known in the art, if deep discharge is effected after repetition of shallow discharge, the nickel-cadmium battery presents two-stage voltage drops during the deep discharge, and such a phenomenon is referred to as the memory effect.

In FIG. 8 and FIG. 9, the battery voltage falls slowly from 1.3 V to 1.1 V for a first 60 min. from the beginning of the discharge. However, after the first 60 min. elapses, there occurs a rapid drop in the battery voltage.

From the graphs of FIGS. 8 and 9, it can be seen that care must be taken 1) to not repeat complete discharge and 2) to not repeat only shallow discharge that tends to cause the memory effect. That is, it is desirable for the battery unit to be recharged and discharged at a proper discharge depth.

Having empirically estimated that the memory-effect inducing voltage level is 1.1 V/cell in the case of the battery unit 26 having the rated voltage of 1.2 V, the electric lawn mower 10 of the invention is provided with the display lamp 37 (FIG. 7) that is kept illuminated until the battery voltage drops below 9.7 Volts/cell with a view to setting the memory-effect inducing voltage level to less than 1.1 Volts/ cell. Namely, the electric lawn mower 10 is provided with such a display lamp 37 that is kept illuminated as long as the voltage of the battery unit 26 exceeds the predetermined voltage level immediately above the memory-effect inducing voltage level. With the thus-operating display lamp 37, it is possible to properly indicate to the human operator when the battery unit 26 is to be recharged, to thereby prevent the operating life of the battery unit 26 from being shortened due to improper recharge.

Figure 10A:
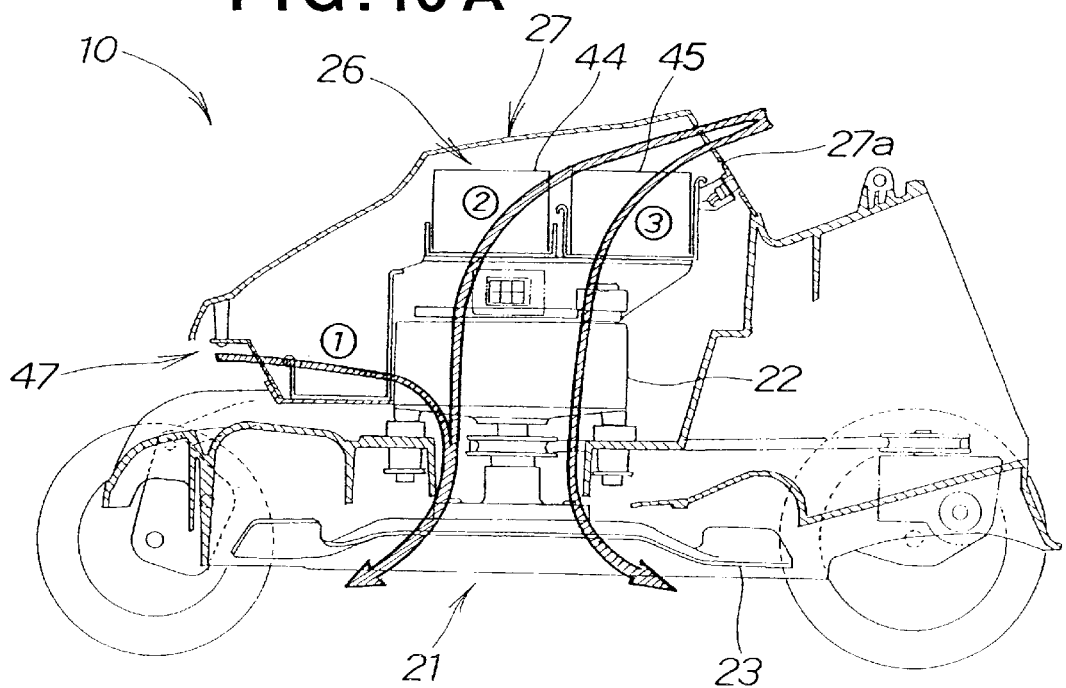
FIG. 10A shows the flow of air as the electric lawn mower is in operation and FIG. 10B shows the flow of air immediately after the electric lawn mower is out of operation.
Figure 10B:
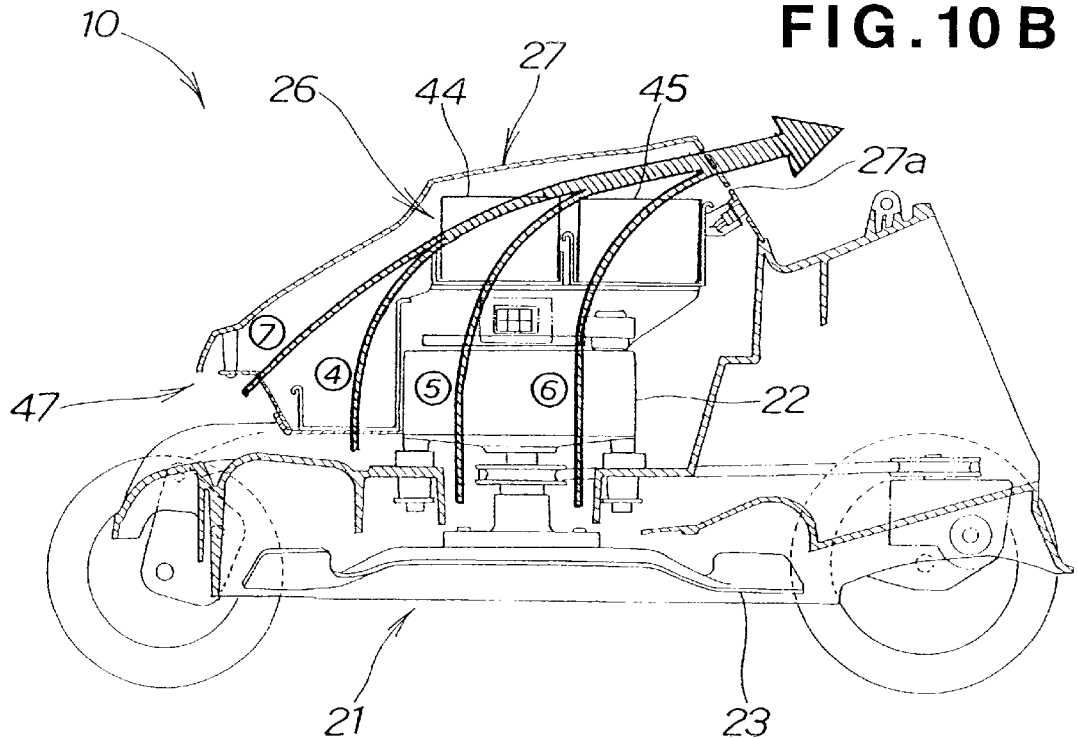

The following paragraphs describe how to cool the electric motor 22 and the battery unit 26. FIGS. 10A and 10B are views explanatory of behavior of the electric lawn mower 10, of which FIG. 10A shows flows of air through the lawn mower 10 while the lawn mower 10 is actually operating and FIG. 10B shows flows of air through the lawn mower 10 immediately after the operation of the lawn mower 10 has been terminated.

When the lawn mower 10 is in operation as shown in FIG. 10A, the rotating cutter blade 23 produces a negative pressure within the cutter housing 21. Thus, external air is drawn in through the louver openings 47a (FIG. 4), and flows into the cutter housing 21 through the communicating holes 32 (FIG. 4) formed beneath the motor 22, as shown by arrow 1.

In the meantime, external air is drawn in through the air vents 27a of the covering 27, passes along sides of the first and second upper batteries 44 and 45 and flows into the cutter housing 21 through the communicating holes 32, as shown by arrows ②, ③. The air flows indicated by arrows ① to ③ can compulsorily cool the first and second upper batteries 44 and 45 and the electric motor 22.

When the electric lawn mower 10 has been deactivated as shown in FIG. 10B, the first and second upper batteries 44 and 45 and electric motor 22 are in a considerably heated condition. The batteries 44 and 45 and electric motor 22 are cooled by natural convection of the air introduced through the communicating holes 32 and passing around the upper batteries 44 and 45 and motor 22, as shown by arrows ④ to ⑥, and such air flows may cause other external air to be drawn in through the louver openings 47a, pass around the batteries 44 and 45 and motor 22 and escape through the air vents 27a of the covering 27 along with the other air flows, as shown by arrow ⑦, so that further heat radiation from the upper batteries 44 and 45 and motor 22 can be promoted.

Rotation of the cutter blade 23 produces air flow from the openings 47a and the air vents 27a into the cutter housing 21 through the communicating holes 32 open to the covering 27. When the cutter blade 23 is not rotating, on the other hand, reverse flow of air from the communicating holes 32 are produced from within the cutter housing 21 to the air vents 27a by the heat of the upper batteries 44 and 45 and motor 22.

Figure 11:
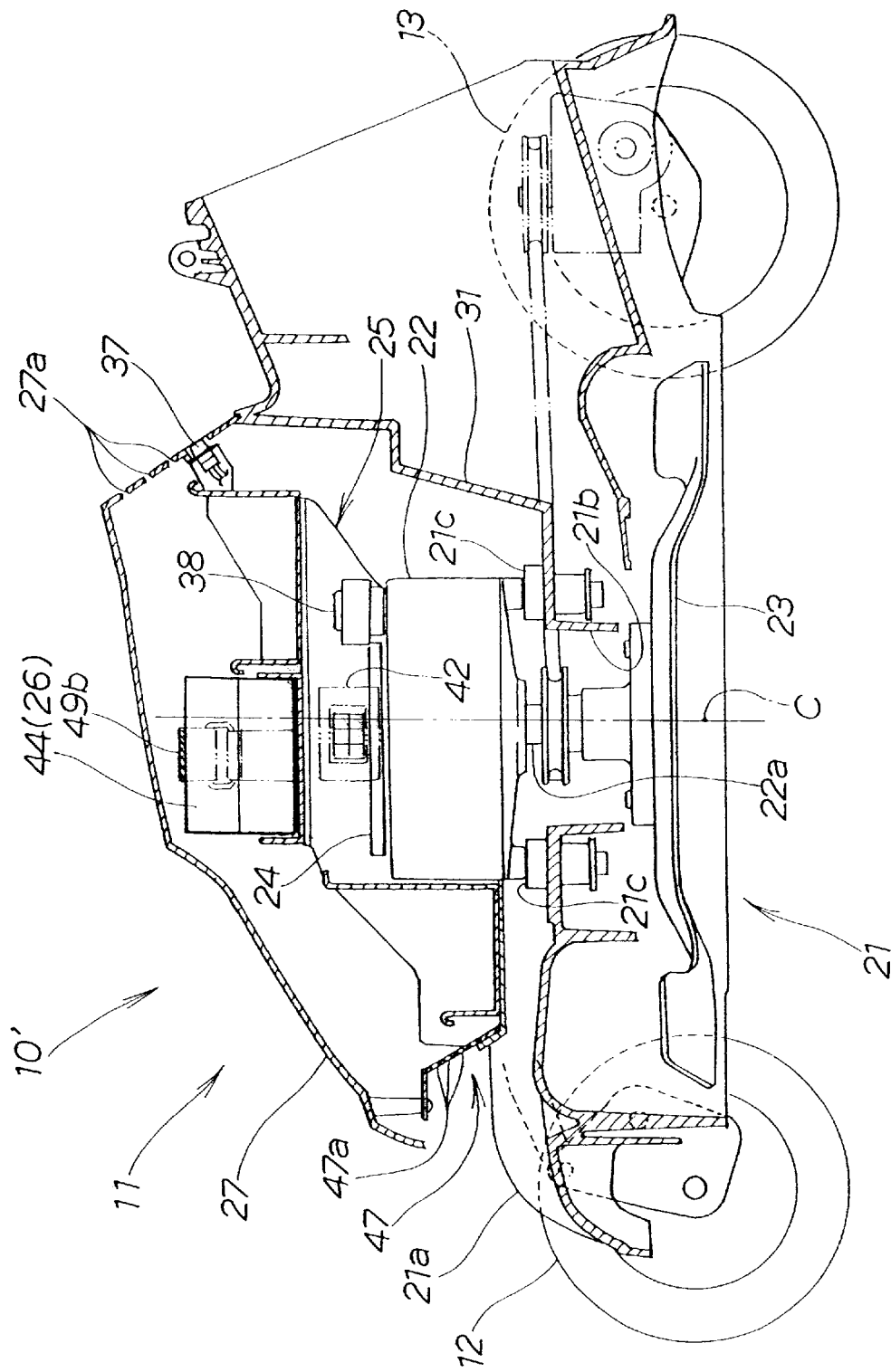
FIG. 11 shows a modified electric lawn mower according to the present invention.

Referring to FIG. 11, there is shown a modified electric lawn mower 10' in accordance with the present invention. The lawn mower 10' differs from the lawn mower 10 in that the first upper battery 44 alone is positioned above the electric motor 22. The rotation shaft 22a has its axis C extending through the first upper battery 44. The elements of the lawn mower 10' in common with those of the lawn mower 10 are identically numbered, and their description is omitted.

Whether the human operator can handle the electric lawn mower 10 well depends upon where the heavy battery unit 26 is disposed. In the electric lawn mower 10' as shown in FIG. 11, the upper battery 44 is positioned above the electric motor 22 so that the axis C extends therethrough. It thus becomes possible to achieve appropriate weight balance of the electric lawn mower 10', which can thereby improve operability of the electric lawn mower 10'. Such an electric lawn mower 10' is easy to handle.

The upper battery 44, as shown in FIG. 11, does not necessarily have its center positioned on the axis C.

Figure 12:
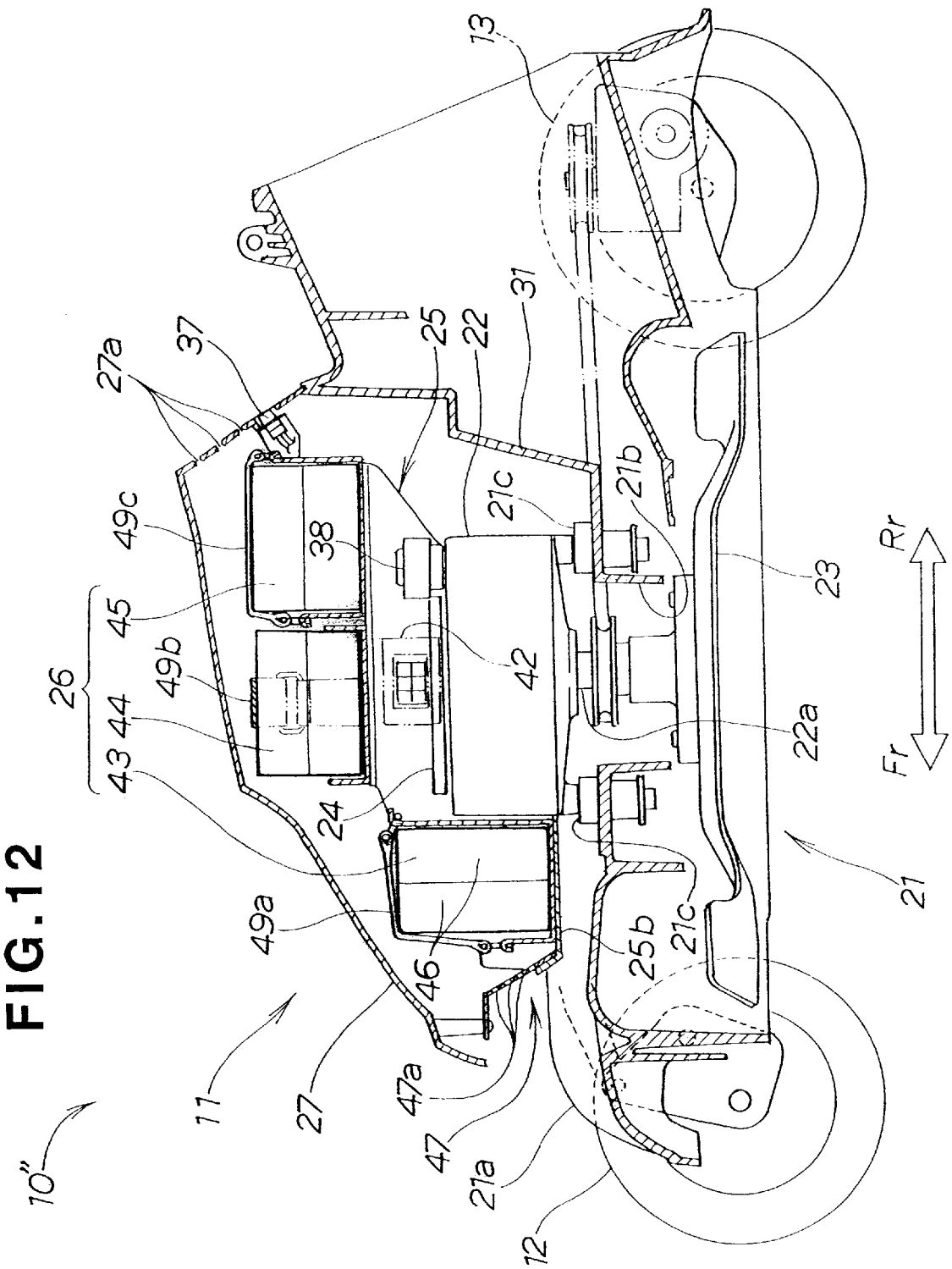
FIG. 12 shows a further modified electric lawn mower according to the present invention.

As shown in FIG. 12, there is a further modified electric lawn mower 10". The lawn mower 10" differs from the lawn mower 10 in that the battery unit 26 includes a front battery 43 as well as the first and second upper batteries 44, 45. The first and second upper batteries 44, 45 are disposed above the electric motor 22 while the front battery 43 is positioned in front of the electric motor 22. The elements of the lawn mower 10" in common with those of the lawn mower as shown in FIG. 5 are identically numbered, and their descriptions are omitted.

Similarly to the first and second upper batteries 44, 45, the front battery 43 includes a group of electric cells 46 each having a rated voltage of 1.2 V, and this front battery 43 is mounted on the forward extension portion 25b of the battery bracket 25 with each of the cells in an upright position. The front battery 43 is a nickel-cadmium battery, similarly to the first and second upper batteries 44, 45. The front battery 43 is fastened to the battery bracket 25 by an elastic belt 49a.

With the first and second upper batteries 44, 45 positioned above the electric motor 22 and with the front battery 43 disposed forwardly of the electric motor 22, it thus becomes possible to achieve appropriate weight balance of the electric lawn mower 10", which can thereby improve operability of the electric lawn mower 10".

Figure 13:
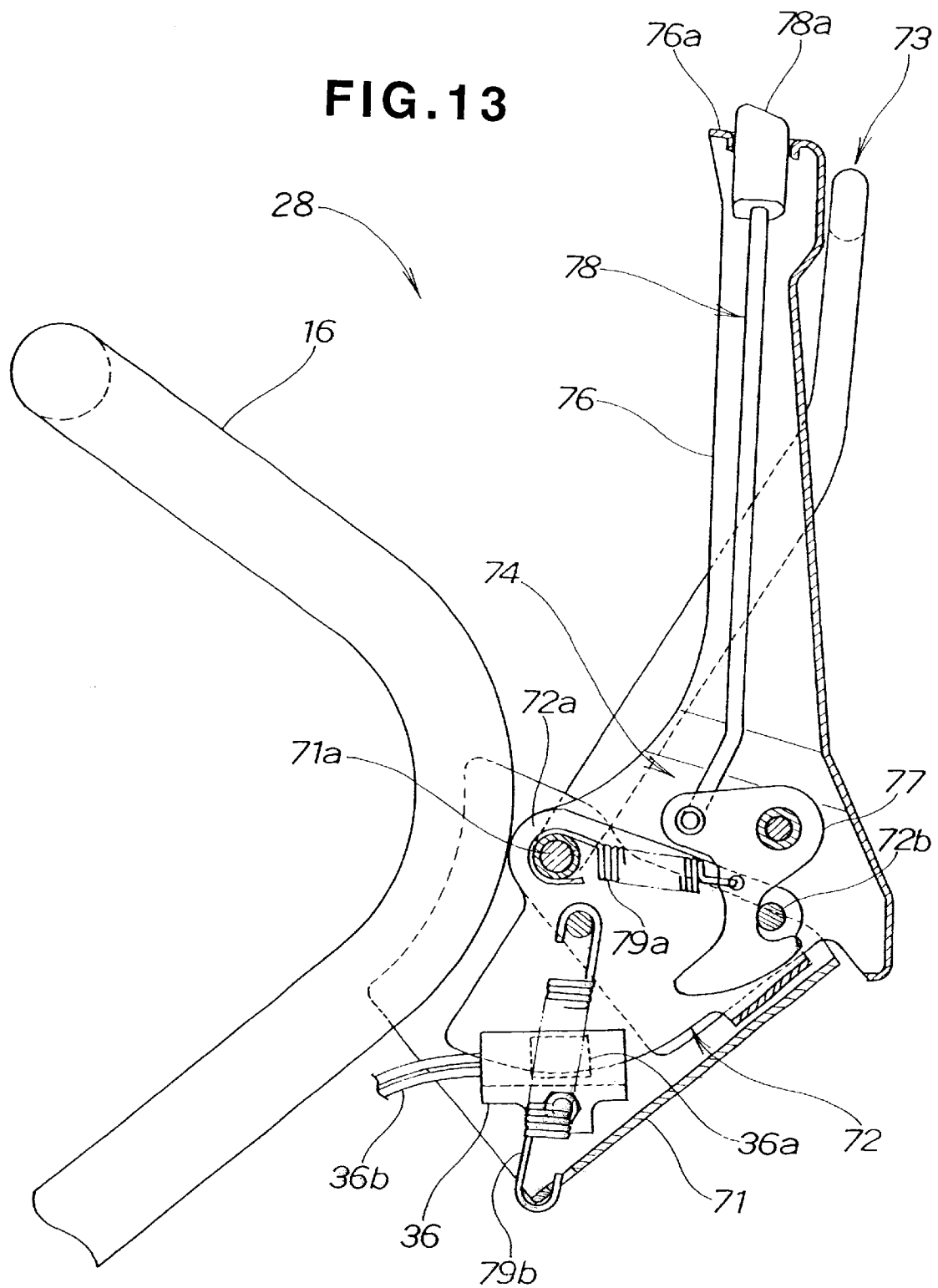
FIG. 13 shows, partly in cross-section, a switch operation mechanism in the electric lawn mower of the invention.

FIG. 13 shows, on an enlarged scale, the switch operation mechanism 28.

The switch operation mechanism 28 is provided leftwardly of the handle 16 for the human operator to turn on/off the electric motor 22 (see FIG. 2). The switch operation mechanism 28 includes a bracket 71 secured to the left side of the handle 16, the noncontact reed switch 36 fixed to the bracket 71, and the fan-shaped actuating member 72 pivotally connected at its pivot portion 72a to the bracket 71 and functions to determine the ON/OFF state of the reed switch 36. The switch operation mechanism 28 also includes the handling lever 73 for causing the actuating member 72 to pivot, and the clutch mechanism 74 for bringing the handling lever 73 and actuating member 72 into or out of engagement with each other. Reference numeral 71a represents a support pin attached to the bracket 71, about which the actuating member 72 can pivot relative to the bracket 71.

The actuating member 72 is made of a magnetic material, such as an iron-based material. The noncontact reed switch 36 has a magnet 36a and is set to the ON or OFF state in accordance with a variation in magnetic flux that is caused by the actuating member 72 moving toward or away from the magnet 36a. Reference numeral 36b in FIG. 13 represents a harness for connecting the reed switch 36 with the control section 24 (see FIG. 4).

Viewed in front elevation, the handling lever 73 takes the form of a generally inverted-U. The lever 73 has a left end pivotally mounted via the bracket 71 to the handle 16 and has a right end pivotally mounted to the handle 16.

The clutch mechanism 74 includes a lever member 76 pivotally connected to the bracket 71 and mounted to the same shaft as the handling lever 73, a hook member 77 pivotally mounted to the lever member 76, and a hook driving rod 78 having one end pivotally mounted to the hook member 77 and the other end slidably mounted to a distal end 76a of the lever member 76. The clutch mechanism 74 also includes a tension spring 79a connecting between the hook member 77 and the support pin 71a, an engaging pin 72b provided on the actuating member 72, and a tension spring 79b connecting between the actuating member 72 and the bracket 71. Reference numeral 78a represents a knob of the hook driving rod 78.

Figure 14:
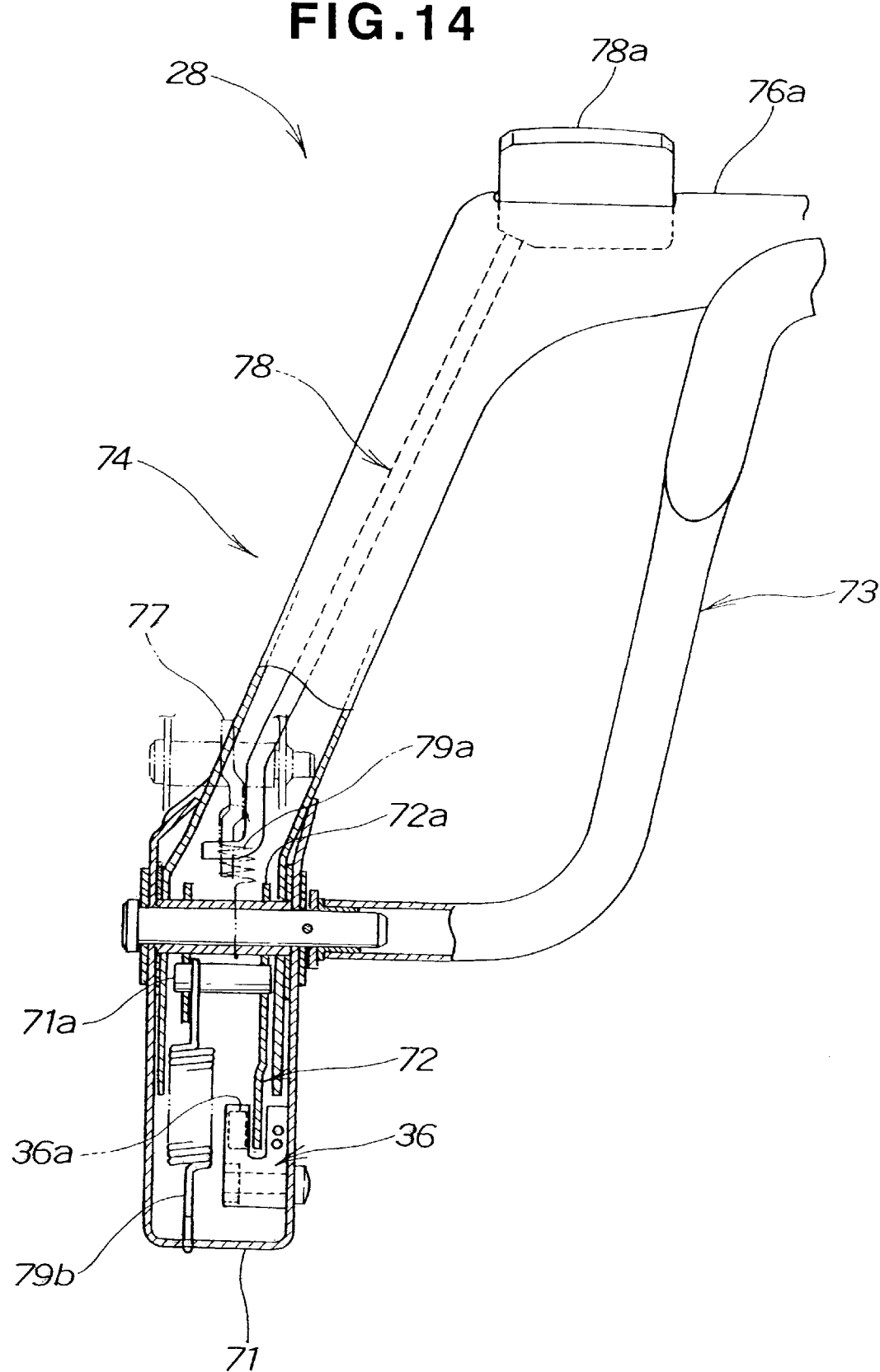
FIG. 14 shows, partly in cross-section, the switch operation mechanism of FIG. 13 as viewed in front elevation.

FIG. 14 is a sectional front view of the switch operation mechanism 28 in the electric lawn mower 10 of the invention.

As clearly seen here, the switch operation mechanism 28 includes the noncontact reed switch 36 for performing ON/OFF control of the motor 22, the fan-shaped actuating member 72 having its pivot portion 72a pivotally mounted to the handle 16 for setting the ON/OFF state of the reed switch 36, and the handling lever 73 for causing the actuating member 72 to pivot about the support pin 71a.

Pivotal movement of the fan-shaped actuating member 72 away or towards the reed switch 36 turns on or off the electric motor 22. With this arrangement, the reed switch 36 can reliably perform a switching operation. The actuating member 72 can be pivoted through various angles to bring the reed switch 36 to ON or OFF state. There can be achieved a greater freedom to design the switch operating mechanism 28.

Further, by providing the noncontact reed switch 36 and handling lever 73 at a short distance from each other in the switch operation mechanism 28, a simple and direct switching structure for the ON/OFF control of the electric motor can be achieved.

Furthermore, with the clutch mechanism 74 provided between the handling lever 73 and the actuating member 72 for bringing these components 72, 73 into or out of engagement with each other, it is possible to prevent erroneous ON/OFF switching operations of the switch operation mechanism 28, and thus the operability of the electric lawn mower 10 can be enhanced.

Operation of the above-described switch operation mechanism 28 is described below, with reference to FIGS. 13A to 13C.

FIG. 15A through FIG. 15C illustrate how the switch operation mechanism 28 is operated.

FIG. 15A shows the switch operation mechanism 28 before the electric motor 22 is activated. In the illustrated example, the noncontact reed switch 36 is in the OFF state with the actuating member 72 held close to the magnet 36a of the reed switch 36.

Further, the clutch mechanism 74 is in a non-clutching state where the hook member 77 is not engaging the engaging pin 72b of the actuating member 72, so that the actuating member 72 will not pivot even if the handling lever 73 is turned in an arrow "a" direction. Namely, the electric motor 22 does not rotate unless the reed switch 36 is changed from the OFF state to the ON state.

FIG. 15B shows that as the hook driving rod 78 is depressed as shown by arrow "b1", the hook member 77 pivots to engage with the engaging pin 72b of the actuating member 72 as shown by arrow "b2". Then, the handling lever 73 is turned along with the lever member 76 as shown by arrow "b3", so that the actuating member 72 pivots as shown by arrow "b4".

However, even after the actuating member 72 has pivoted like this, the actuating member 72 is still located close to the magnet 36a of the noncontact reed switch 36, and thus the reed switch 36 remains in the OFF state.

Then, as shown in FIG. 15C, the handling lever 73 is further turned as shown by arrow "c1", which causes the actuating member 72 to pivot away from the magnet 36a of the reed switch 36. Thus, the reed switch 36 is set to the ON state, in response to which the rotation of the electric motor 22 is initiated.

The present disclosure relates to the subject matter of Japanese Patent Application No. 2001-252010, 2001-252072, and 2001-252080, filed Aug. 22, 2001, the disclosures of which are expressly incorporated herein by reference in its entirety.

What is claimed is:

1. An electric lawn mower comprising:
    a cutter blade;
    a cutter housing enclosing the cutter blade therein;
    an electric motor for rotating the cutter housing;
    at least one rechargeable battery unit for driving the electric motor, the battery unit comprising at least one upper battery disposed above the electric motor and a front battery positioned in front of the electric motor; and
    a battery bracket attached to the cutter housing, the battery bracket including a body portion covering the sides and top of the electric motor, and an extension portion extending forward from the body portion, the body portion having the upper battery mounted thereon, the extension portion having the front battery mounted thereon, and the upper battery being spaced from the front battery.

2. An electric lawn mower as claimed in claim 1; wherein the electric motor includes a rotational shaft having an axis extending through the upper battery disposed above the electric motor.

3. An electric lawn mower as claimed in claim 1; wherein the battery bracket and the electric motor are secured together to the cutter housing.

4. An electric lawn mower as claimed in claim 1; wherein the battery bracket is made of metal and has air vents formed at portions thereof where the battery unit is mounted.

* * * * *